Figure 1:
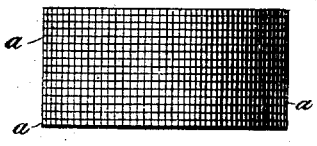

J. J. SAWIN.

TREATING LEATHER FOR THE HEELS AND SOLES OF BOOTS AND SHOES.

No. 7,667. Reissued May 8, 1877.

Witnesses

Harry King
Jr.

D. P. Cowl

Inventor.

James J. Sawin,
By his Attorneys,
Stansbury & Munn

UNITED STATES PATENT OFFICE.

JAMES J. SAWIN, OF NATICK, MASSACHUSETTS.

IMPROVEMENT IN TREATING LEATHER FOR HEELS AND SOLES OF BOOTS AND SHOES.

Specification forming part of Letters Patent No. 163,948, dated June 1, 1875; reissue No. 7,667, dated May 8, 1877; application filed April 16, 1877.

*To all whom it may concern:*

Be it known that I, JAMES J. SAWIN, of Natick, in the county of Middlesex and State of Massachusetts, have invented certain new and useful Improvements in Treating Leather for the Extraction of Oil Therefrom; and I do hereby declare that the following is a full, clear, and exact description thereof, that will enable others skilled in the art to which it appertains to make and use the same, reference being had to the accompanying drawings, and to the letters of reference marked thereon, which form a part of this specification:

This invention has for its object the treatment of waste strips or scraps of curried and oiled or dressed leather, such as is commonly used for uppers for harness and for belting, for the purpose of freeing such leather from oil, in order to make it fit for use in the manufacture of heels, soles, insoles, and fillings for boots and shoes; and consists in a process for treating leather for such purposes, and in the heel-blanks made therefrom as a new article of manufacture.

In the manufacture of boots and shoes there are large quantities of waste leather or scraps of calf-skin, &c., known as "upper leather." This leather is of good quality, and would be well adapted for the manufacture of heels, soles, insoles, and fillings were it not for the oil with which it is saturated. A heel made of lifts of this oiled leather would not be suitable to use in the manufacture of boots and shoes, for the reason that the oil from the leather will work through the top lift or the layer at the exposed end of the heel, which, in all first-class shoes, is left of a light color, and will injure the appearance of the top lift and spoil the sale of the shoe. Moreover, such a heel will not receive the blacking and polish under the action of the burnisher as is necessary for first-class work; and, further, the oil will work up through the thin inner soles and soil the stockings. By this my invention the heel-blank, sole, or filling made from this waste or scrap curried and oiled leather is freed from oil, and the leather is left in the condition of leather simply tanned, or as sole-leather, and a heel made of it will burnish as readily as one made of the best sole-leather. By this my invention I am enabled to produce a very cheap heel, and at the same time I am enabled to save the oil in the leather to be used again.

I place the pieces of oiled leather in a suitable receptacle and cover them with naphtha, or other volatile hydrocarbons, or products of petroleum capable of taking up or combining with the oil in the leather, the quantity of naphtha being determined by the quantity of oil in the leather, or whether or not the leather is to be subjected, after immersion, to pressure.

In practice I find that leather containing about twenty per cent. of oil requires about fifteen gallons of naphtha to one hundred pounds of leather, and the leather is left in the naphtha until the oil is thoroughly diffused throughout the naphtha, and I prefer to agitate the liquid naphtha while covering the leather. The combination of oil and naphtha is then drawn off from below, and, if desired, fresh naphtha may be added for a second immersion of the leather; or the leather may be squeezed by a suitable squeezing-machine, and the leather, when removed from the naphtha, is allowed to dry. The naphtha containing the oil is then separated by distillation, the naphtha passing over and the oil extracted from the leather remaining in the still.

In making heels I prefer, first, to die out into the shape of heel-lifts; and, second, secure such lifts together with a nail, making a heel-blank, and such blanks of accumulated heel-lifts, when immersed in and removed from the naphtha and dried, are found to be substantially free from oil.

Belting-leather may be treated in this way, and it is then fitted for soles, and oiled leather so treated is adapted for filling between the soles, for inner soles, and for fillings.

Turpentine may be used instead of naphtha; but it will not operate as well, and would be more expensive.

In the drawing, Figure 1 represents an edge view of a heel-blank made from layers of upper leather, *a a* being the layers of substantially uniform thickness. The grain of the upper leather is finer than the grain of the sole-leather, and the heel, when attached to the shoe and trimmed, presents a very smooth surface for the reception of the blacking, and a surface which polishes finely.

Figure 2:
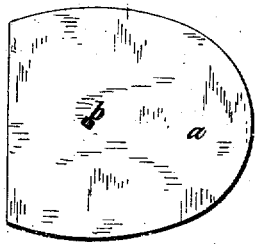

Fig. 2 represents a top view of one of my heels, showing the nail *b* for holding the lifts together, forming the heel-blank, as an article of commerce.

I claim—

1. In the process of manufacturing heels, soles, and fillings from curried and oiled leather, the immersion of the oiled leather to form said articles in naphtha or other volatile hydrocarbons, substantially as described.

2. The process of treating oiled leather with naphtha or other volatile hydrocarbons, for the purpose of extracting the oil from the same, substantially as specified.

3. As a new article of manufacture, a heel-blank made from lifts or layers of scrap upper leather with the oil extracted, substantially as described.

In testimony that I claim the foregoing I have hereunto set my hand this 13th day of April, 1877.

JAMES J. SAWIN.

Witnesses:

GEO. F. GRAHAM,

CHAS. F. STANSBURY.